US007231385B2

(12) United States Patent
Bernal et al.

(10) Patent No.: US 7,231,385 B2
(45) Date of Patent: Jun. 12, 2007

(54) METHOD, SYSTEM, AND PROGRAM FOR POSITIONING A CURSOR ON ROWS OF A RESULT TABLE

(75) Inventors: Margaret Ann Bernal, San Jose, CA (US); Christopher John Crone, San Jose, CA (US); Claire Willey McFeely, San Jose, CA (US); Kalpana Shyam, Los Altos, CA (US); Julie Ann Watts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 10/624,964

(22) Filed: Jul. 21, 2003

(65) Prior Publication Data

US 2005/0021505 A1    Jan. 27, 2005

(51) Int. Cl.
*G06F 7/00* (2006.01)
*G06F 17/30* (2006.01)
(52) U.S. Cl. .............. 707/3; 707/4; 707/10; 707/101; 709/203; 709/219
(58) Field of Classification Search .............. 707/1, 707/3, 4, 8, 10, 100, 2, 5, 9, 101; 709/203, 709/219
See application file for complete search history.

(56) References Cited

U.S. PATENT DOCUMENTS

| 5,446,858 | A | | 8/1995 | Copeland et al. |
| 5,835,904 | A | * | 11/1998 | Vicik et al. ..................... 707/1 |
| 6,128,610 | A | * | 10/2000 | Srinivasan et al. ............ 707/3 |
| 6,266,716 | B1 | | 7/2001 | Wilson et al. |
| 6,397,227 | B1 | * | 5/2002 | Klein et al. .................. 707/200 |
| 6,973,457 | B1 | * | 12/2005 | Bastawala et al. ............ 707/10 |
| 2002/0029211 | A1 | * | 3/2002 | Bonner et al. .................. 707/3 |
| 2002/0087561 | A1 | * | 7/2002 | Ching Chen et al. ....... 707/100 |
| 2002/0143728 | A1 | * | 10/2002 | Cotner et al. ................... 707/1 |
| 2002/0143751 | A1 | * | 10/2002 | Chow et al. .................... 707/3 |

* cited by examiner

*Primary Examiner*—Mohammad Ali
*Assistant Examiner*—Usmaan Saeed
(74) *Attorney, Agent, or Firm*—Konrad Raynes & Victor LLP; David W. Victor

(57) ABSTRACT

Provided are a method, system, and program for making data available to an application program. A cursor is generated positioned with respect to a result table, wherein the cursor specifies a search criteria, and wherein the result table includes rows from a base table that satisfy the search criteria. A fetch request is received indicating to position the cursor on a plurality of rows of the result table. The cursor is positioned on the plurality of rows of the result table indicated in the fetch request that satisfy the search criteria.

31 Claims, 9 Drawing Sheets

METHOD, SYSTEM, AND PROGRAM FOR POSITIONING A CURSOR ON ROWS OF A RESULT TABLE

BACKGROUND OF THE INVENTION

1. Field of the Invention

The present invention relates to a method, system, and program for positioning a cursor on rows of a result table.

2. Description of the Related Art

Database programs include a feature referred to as cursors. A cursor is a named control structure used by an application program to point to a row of interest within some set of rows and to retrieve rows from the set, possibly making updates and deletions. A cursor points to rows from a database table that satisfy a structured query language (SQL) query against the table. The rows in the table that satisfy the SQL query comprise a result table of data. The SQL query includes an SQL SELECT statement and a WHERE clause to qualify rows according to a search condition. An application can then access data on a row-by-row basis from the result table.

If the result table is static, then the result table may be materialized in a workfile. Alternatively, the cursor may be dynamic and point directly to the rows in the base table. In such case, the result table is not materialized in a workfile and the cursor is updateable when the base table is updated.

After a cursor is opened or initialized, an application program may issue fetch statements to move a cursor positioned on a row one or more rows, forward or backward, from a current cursor position. In current implementations, if a cursor is implemented as sensitive, then changes made to the database after the result table is materialized are visible to the cursor. The cursor has some level of sensitivity to any updates or deletes made to the rows underlying its result table after the table is materialized. The cursor may further be sensitive to positioned updates or deletes using the same cursor. Additionally, the cursor can have sensitivity to committed changes made outside this cursor. A static cursor specifies that the size of the result table and the order of the rows does not change after the cursor is opened. Rows inserted into the underlying table are not added to the result table regardless of how the rows are inserted. Rows in the result table do not move if columns in the ORDER BY clause are updated in rows that have already been materialized. Positioned updates and deletes are allowed if the result table is updatable. The SELECT statement of a cursor that is defined as SENSITIVE STATIC cannot contain an INSERT statement. Further, a static cursor may have visibility to changes made by this cursor using positioned updates or deletes. Committed changes made outside this cursor are visible with the SENSITIVE option of the FETCH statement. A FETCH SENSITIVE can result in a hole in the result table (that is, a difference between the result table and its underlying base table). If an updated row in the base table of a cursor no longer satisfies the predicate of its SELECT statement, an update hole occurs in the result table. If a row of a cursor was deleted in the base table, a delete hole occurs in the result table. When a FETCH SENSITIVE detects an update hole, no data is returned (a warning is issued), and the cursor is left positioned on the update hole. When a FETCH SENSITIVE detects a delete hole, no data is returned (a warning is issued), and the cursor is left positioned on the delete hole.

Open DataBase Connectivity (ODBC) is a standard database access method to allow applications to access data in a database management system (DBMS). An ODBC driver translates the application's queries into statements that the DBMS understands. The ODBC standards describe scrollable, keyset driven, static and dynamic cursors. The ODBC standards mention that cursors may be updateable or non-updateable. Cursors are defined as updateable if the application is capable of modifying the data in the cursor result table. As discussed, the result table may be implemented in a work file or comprise the rows pointed to by the cursor in the base table. The ODBC also mentions that when positioned on a row in an updateable cursor, the application can perform position updates or delete operations that target the base table rows used to build the current row in the cursor.

The ODBC defines the following types of cursors:

scrollable cursor: allows the application to fetch forward or backward from the current position, i.e., from anywhere, in the result table. With a scrollable cursor, your application can request by position the data presented in the current row. Typical scrolling requests include moving one row forward, one row back, to the beginning, or to the end of the result table. With a scrollable cursor, the application can request that a certain row of data be made the current row more than once.

forward-only cursor: allows the application to fetch forward serially from the start to end of the result table.

keyset cursor: the rows in the result table are identified by the value present in a designated column.

static cursors contain data that was placed in the cursor when it was created. A static cursor may be sensitive, where changes are accessible to the cursor, or static insensitive where no changes are visible.

dynamic cursors: Dynamic cursors reflect all changes made to the rows in their result table when scrolling through the cursor. The data values, order, and membership of the rows in the result table can change on each fetch. All UPDATE, INSERT, and DELETE statements made by all users are visible through the cursor. Updates are visible immediately if they are made through the cursor. Updates made outside the cursor are not visible until they are committed, unless the cursor transaction isolation level is set to read uncommitted. Updates made outside the cursor by the same transaction as that which defines the cursor are immediately visible.

SUMMARY OF THE PREFERRED EMBODIMENTS

Provided are a method, system, and program for making data available to an application program. A cursor is generated positioned with respect to a result table, wherein the cursor specifies a search criteria, and wherein the result table includes rows from a base table that satisfy the search criteria. A fetch request is received indicating to position the cursor on a plurality of rows of the result table. The cursor is positioned on the plurality of rows of the result table indicated in the fetch request that satisfy the search criteria.

In further implementations, a lock is placed on the plurality of rows of the result table on which the cursor is positioned.

In still further implementations, the cursor may be positioned on a current plurality of rows of the result table before receiving the fetch request, and wherein positioning the cursor further comprises determining a rowset size and positioning the cursor on a number of rows with respect to one row of the result table having rows that satisfy the search criteria.

In yet further implementations, the cursor may be positioned on a current plurality of rows of the result table before receiving the fetch request specifying an integer k, and wherein positioning the cursor further comprises determining a rowset size and positioning the cursor on a number of rows that satisfy the search criteria and is positioned with respect to k rows from row of the result table having rows that satisfy the search criteria.

Additionally, the cursor may comprise one of a static cursor or dynamic cursor, wherein if the cursor is static, then the cursor is either sensitive or insensitive to changes in the base table from which the result table is generated.

BRIEF DESCRIPTION OF THE DRAWINGS

Referring now to the drawings in which like reference numbers represents corresponding parts throughout.

DETAILED DESCRIPTION OF THE
PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
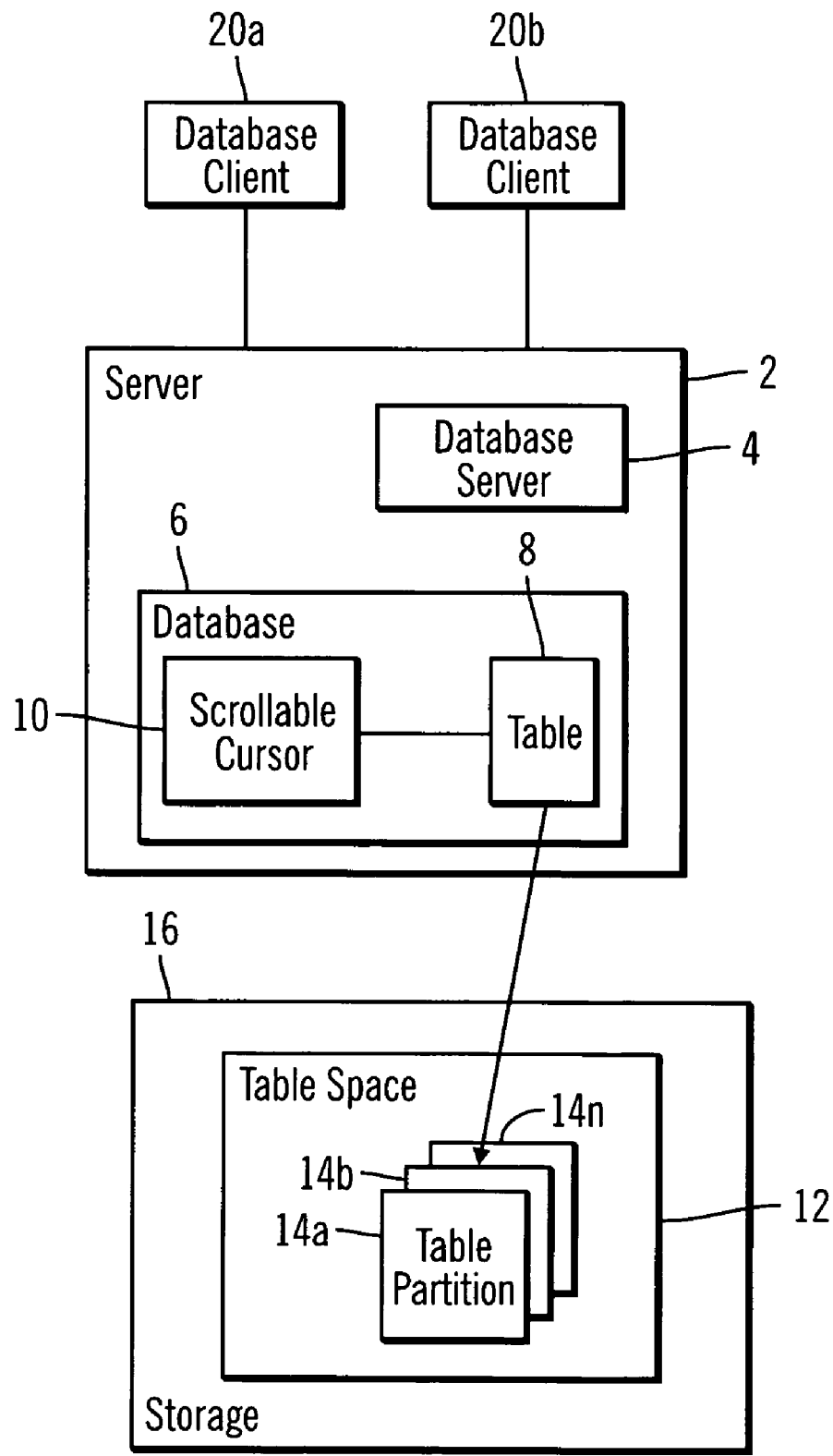
FIG. 1 illustrates a computing environment in which preferred embodiments are implemented.

FIG. 1 illustrates a computing environment in which a database may be implemented. A server 2, which may comprise any server class system known in the art, includes one or more database server programs 4, such as a database management server, that receives and handles database requests, such as database queries, directed to tables or indexes in a database 6. Database 6 is shown as having a table 8 and a scrollable cursor 10 defined on the table. The table 10 data is stored in one or more partitions 14a, 14b . . . 14n in a table space 12 in storage 16. The storage 16 may comprise any type of non-volatile storage device known in the art. Further, any of the partitions 14a, 14b . . . 14n, or part thereof, may be loaded into the memory of the server 2 or the database clients 20a, 20b . . . 20n.

Although only one table 8 and one set of table partitions 14a, 14b . . . 14n are shown, the database 6 may include many tables as well as additional sets of table partitions for the tables. The database 6 may also include index and index partitions on the table rows.

The database server 4 may receive requests directed toward the database 6 from database clients 20a and 20b that comprise a separate system or application capable of submitting requests to access data in the scrollable cursor 10 that includes rows from the table 8 that satisfy a criteria defined for the scrollable cursor 10. The database clients 20a, 20b may communicate with the database server 4 over a network, or the database clients 20a, 20b may comprise programs executing in the server system 2.

Figure 2:
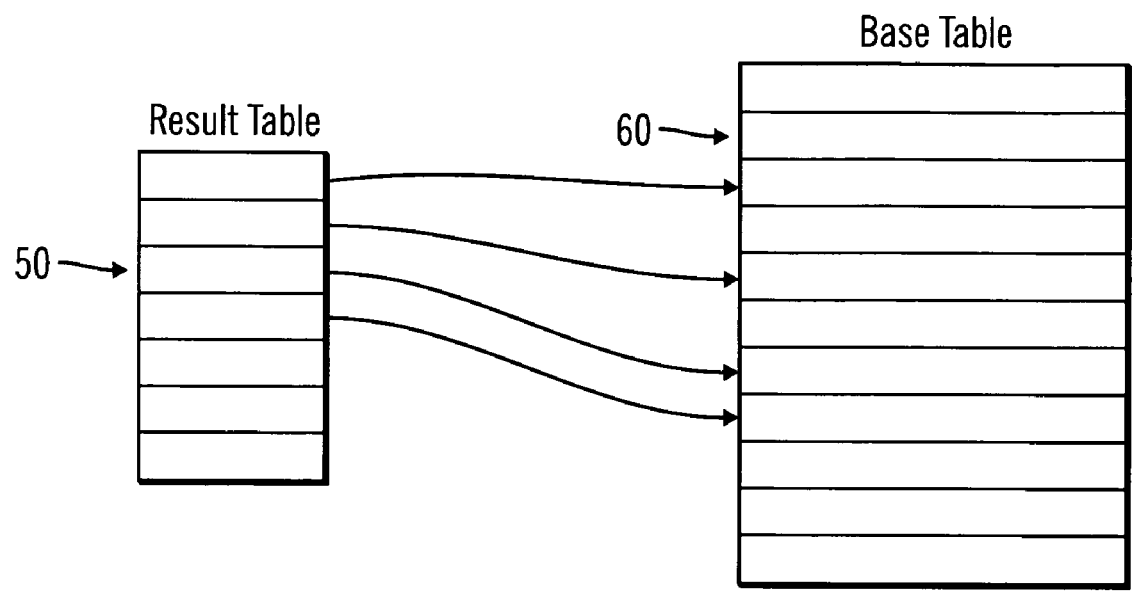
FIGS. 2, 3, and 4 illustrate examples of cursors positioned on one or more rows of a result table in accordance with described implementations.

FIG. 2 illustrates how rows in a cursor result table 50 correspond to rows in a database table 60 as defined in a scrollable cursor, such as scrollable cursor 10. As discussed, the declaration of the cursor would provide a SELECT statement specifying columns of the database table 8 (FIG. 1) and a WHERE clause including one or more predicates to include in the cursor only those table rows that satisfy the predicates. A cursor may also be declared without predicates. The database server 4 would return to the cursor the selected columns in the select list from rows that satisfy the WHERE clause. If the select list includes an expression comprising an operation involving one or more columns, then the database server 4 would further return the result of such operation. The database server 4 would also populate the result table 50 with the returned results. In static cursor implementations, the result table 50 may be implemented as a temporary workfile. Further details of a static cursor are described in the above referenced patent application "Method, System, and Program for Implementing Scrollable Cursors in a Database", having U.S. application Ser. No. 09/656,558, which patent application was incorporated herein by reference above.

Figure 3:
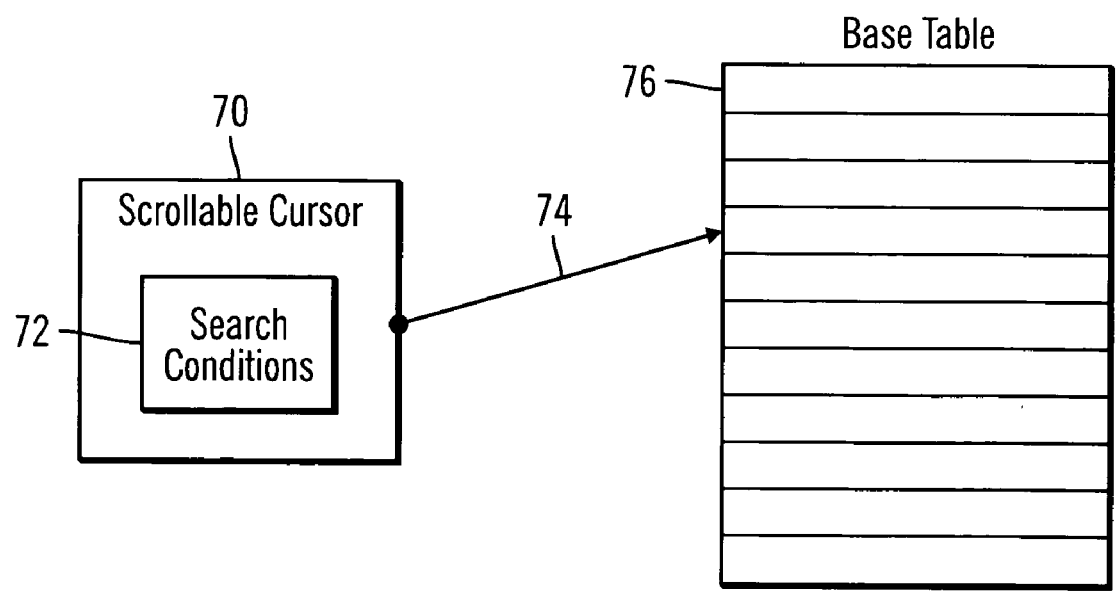

In a dynamic scrollable cursor, the cursor operations, such as fetch forward, backward, relative, etc., are performed directly on a table 8 or index on the table without using a result table. This avoids the need to first buffer those table rows that qualify according to the search condition in a separate result table 50 (FIG. 2). Dynamic scrollable cursors provide access to the actual data because the scrollable cursor operates against the table 8 or index on the table. FIG. 3 illustrates data structures the database server 4 maintains to implement a dynamic scrollable cursor, including a scrollable cursor 70, such as scrollable cursor 10 (FIG. 1), which would be created in response to statements from the database clients 20a, 20b to initiate a scrollable cursor. The scrollable cursor 70 includes search conditions 72, which include the search condition provided with the SQL statements to open the scrollable cursor 70. The scrollable cursor 70 further includes a pointer 74 also known as a "cursor", which addresses the current row in the table 76 being accessed.

In certain implementations, the scrollable cursor may be defined to scroll on search conditions including a key column of an index on a table. For such cursors, the scrollable cursor would scroll on the index, and upon locating an index node satisfying the search conditions of the scrollable cursor, return the row in the table addressed by the index node located in the scrollable cursor fetch operation.

Figure 4:
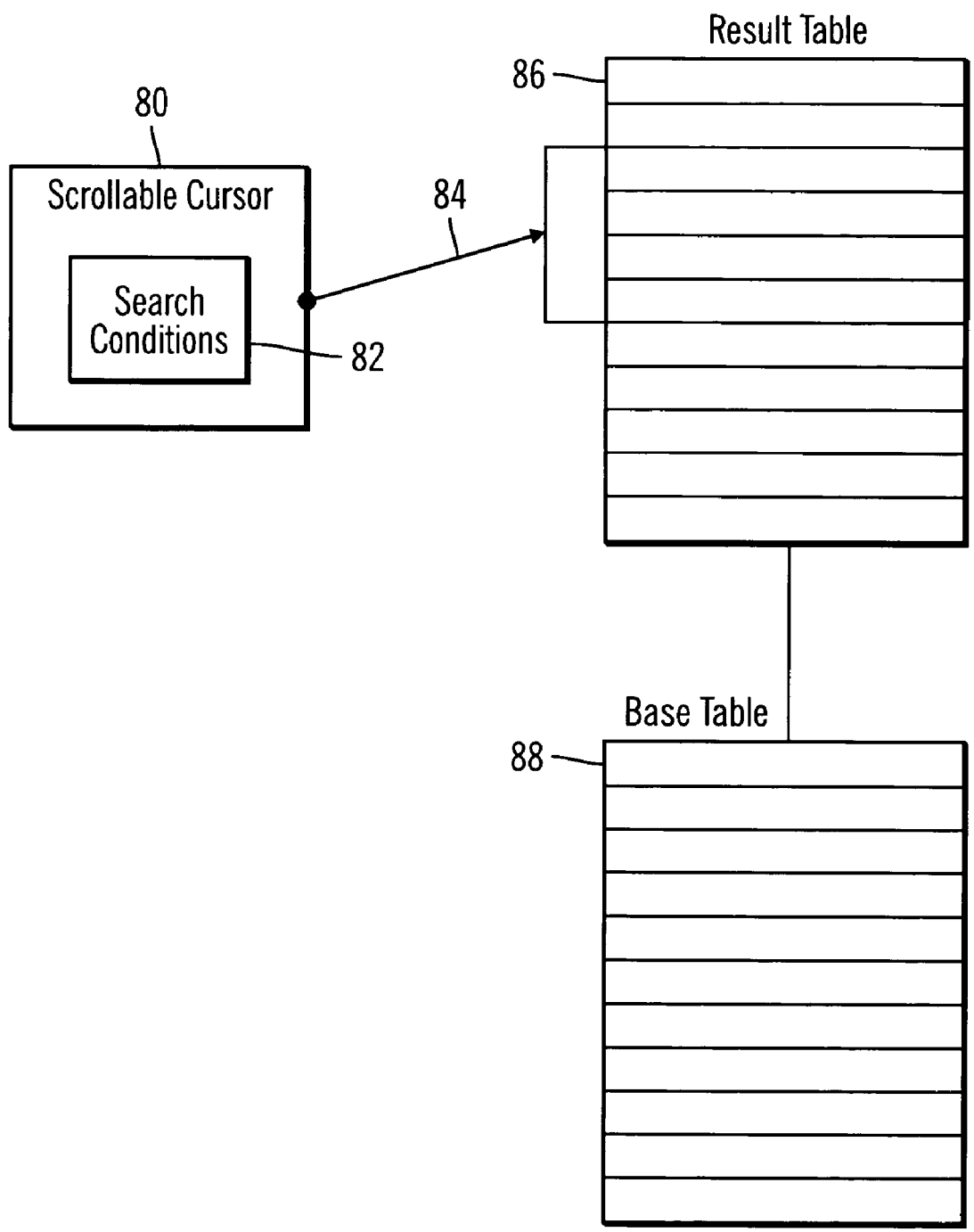

Described implementation allow the definition of a rowset cursor which is defined to be positioned on a plurality of rows (rowset) in the table, as opposed to a single row. FIG. 4 illustrates a scrollable cursor 80 having a rowset cursor 84 positioned on a set of rows in the base table 86, where each row in the rowset satisfies the search conditions 82 defined for that scrollable cursor 80. Further, all the rows on which the rowset cursor 84 is positioned are subject to any lock on the rows. In this way, a rowset cursor 84 is positioned on a plurality of rows. All the rows on which the rowset cursor 84 is positioned would be subject to any lock defined for that cursor.

Figure 5:
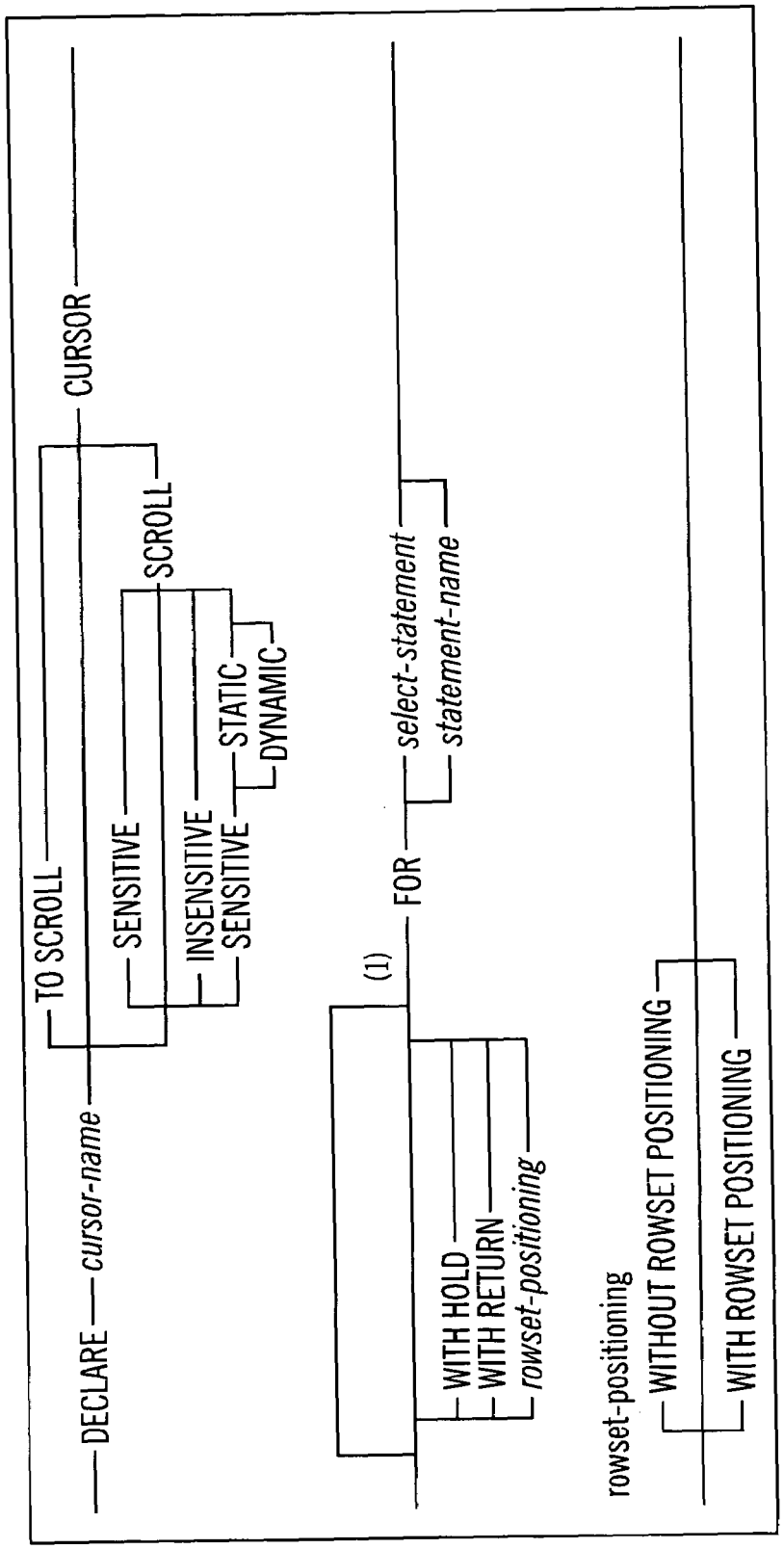
FIG. 5 illustrates the format of a DECLARE cursor statement in accordance with preferred embodiments of the present invention.

The database clients 20a, 20b would initialize a cursor 10 using a declare cursor statement. FIG. 5 illustrates a format of a DECLARE cursor statement in accordance with described implementations. To declare a scrollable cursor, the database client 20a, 20b may specify either "insensitive", "sensitive static", "sensitive dynamic", etc. If "insensitive" is specified, then changes to the database table from which the cursor result table is derived will not be visible to the cursor. Instead, the cursor only provides a read-only view of the contents of the result table or result table. Moreover, a cursor defined as "insensitive" cannot be used for positioned updates or deletes because the cursor is not intended to interact with the base table to ensure data consistency for any positioned updates or deletes to rows in the base table.

A static cursor specified as "sensitive" indicates that changes made to the underlying base table 60 are provided to the cursor when fetching rows from the result table. When the database server 4 processes a sensitive static fetch, then the fetched rows are retrieved from the underlying database table 60, where the predicates in the row in the base table are evaluated to determine whether the base table 60 row satisfies the WHERE criteria in the SELECT statement. Alternatively, the value of columns referenced in predicates of the search condition of the cursor may be stored and a verification may be made as to whether the fields have changed. If so, the row in the underlying base table 60 is updated to the result table 50. The "select statement" path in the DECLARE statement in FIG. 5 provides the select criteria on the database table 60 and may include a WHERE clause with search conditions and operations on the selected columns.

A cursor specified as "scroll" can move backward and forward through the result table. A scrollable cursor may also be declared either "insensitive", "sensitive static" or "sensitive dynamic". In preferred embodiments, a cursor may have the following declarations with the following results:

Scroll not Specified read only: The result table 50 (FIG. 2) is a fixed work file, not a database table. Updates cannot be made to the result table 50 and updates to the underlying records in the base table 60 cannot be viewed through the cursor.

Insensitive Scroll: The result table 50 comprises a database table, and updates to the result table 50 cannot be made nor are updates to the underlying base table 60 observable through the cursor.

Sensitive Static Scroll: The result table 50 is a database table. Updates can be made to the result table 50 and updates to the underlying base table 60 are visible to the cursor when fetching rows in the result table. Updates to the result table 50 are reflected in the base table 60.

Further, the cursor may be defined to be positioned on a plurality of rows (rowset positioning) or positioned on a single row (row positioning). The rowset cursor may be defined with result tables. Further, the number of rows on which the rowset cursor is positioned may not be specified in the established rowset cursor, but may be specified during a FETCH, where the number of rows in the fetched rowset is specified in the FETCH request, e.g., FOR n ROWS, where n is the rowset size, or number of rows in the returned fetched rowset.

Figure 6:
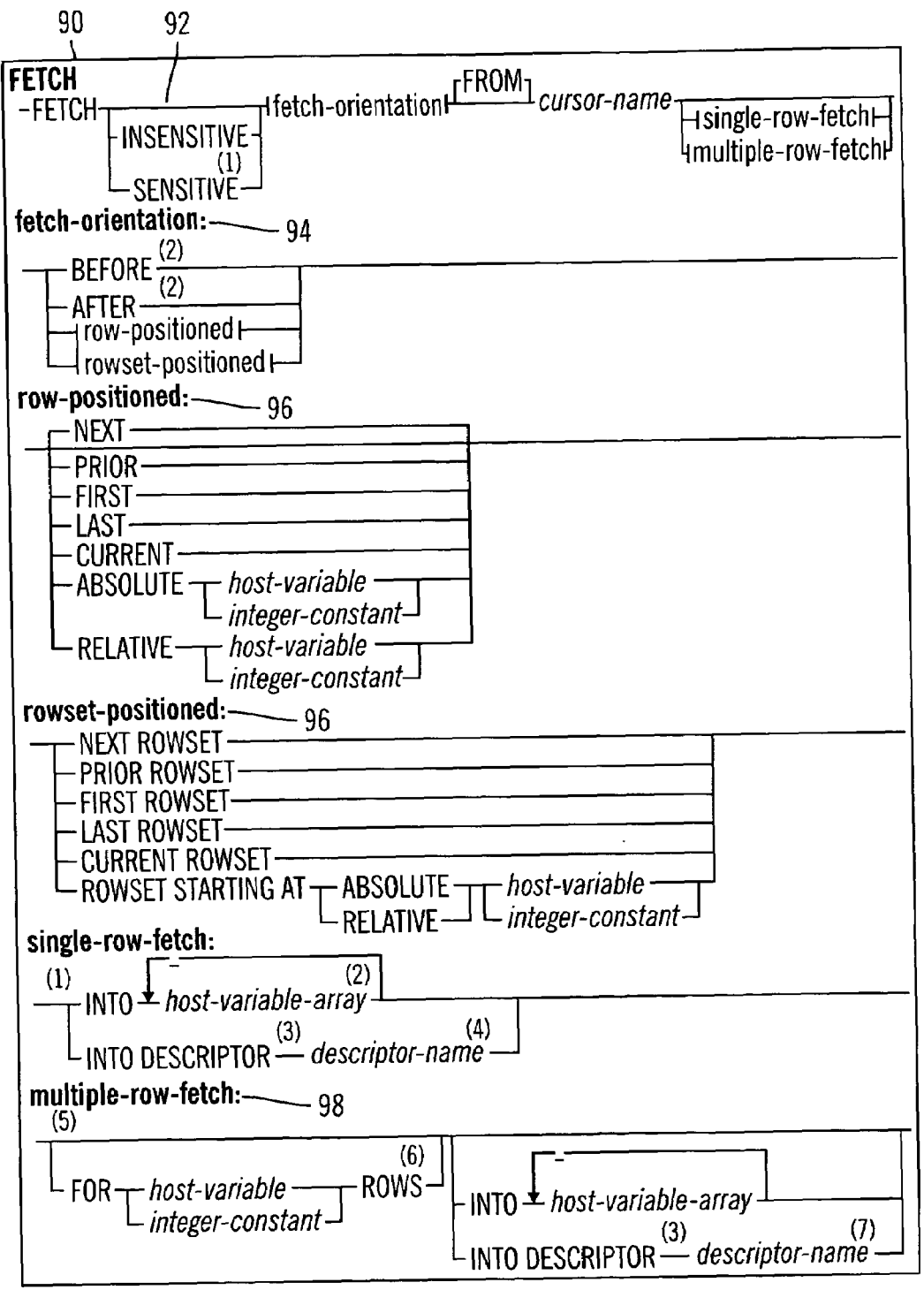
FIG. 6 illustrates the format of a FETCH cursor statement in accordance with preferred embodiments of the present invention.

After the result table 50 (FIG. 2) is populated with rows from the database table according to any qualification criteria in the SELECT statement or after the dynamic cursor 74 (FIG. 3) is established, the database clients 20a, 20b may issue FETCH statements to fetch rows of data from the result table. FIG. 6 illustrates a format of a preferred embodiment FETCH statement 90. The FETCH statement 90 indicates to fetch sensitive or insensitive 92. An "insensitive" FETCH statement returns the row from the result table 50 without accessing the corresponding row in the base table 60. However, it is possible that a previous FETCH SENSITIVE would have altered the row in the result table 50 with updates to the base table 60. Previous updates to the result table 50 would also be reflected in the row. A FETCH SENSITIVE checks the base table 60, thus reflecting changes made outside of the cursor result table 50. FETCH SENSITIVE may be selected for cursors defined as SENSITIVE STATIC SCROLL and for sensitive dynamic cursors. The fetch orientation 94, BEFORE or AFTER, indicates to position the cursor before the first row of the result table or after the last row, respectively, and may be specified with a row positioned fetch.

The FETCH may specify that the fetched cursor is a rowset or row cursor. If the FETCH is for a row positioned cursor 96, then the cursor is positioned with respect to a single row of the result table. The row positioned cursor is shown in FIGS. 2 and 3, where the cursor 74 is positioned on a single row. A rowset cursor 84 (FIG. 4) is positioned on a plurality of rows. The number of rows in the rowset may be specified in the multiple-row fetch field 98, where the clause FOR n ROWS, indicates a rowset having n rows. A rowset cursor 84 is positioned on all rows of the rowset.

The FETCH operations with respect to a row positioned cursor 96 include:

NEXT: positions the cursor on the next row of the result table 50 relative to the current cursor position and fetches the row. NEXT is the default.

PRIOR: positions the cursor on the previous row of the result table 50 relative to the current cursor position and fetches the row.

FIRST: positions the cursor on the first row of the result table 50 and fetches the row.

LAST: positions the cursor on the last row of the result table 50 and fetches the row.

CURRENT: fetches the current row.

BEFORE: positions the cursor before the first row of the result table 50.

AFTER: positions the cursor after the last row of the result table 50.

ABSOLUTE: Evaluates the host variable or integer constant to an integral value k, and then moves the cursor position to the kth row in the result table 50 if k>0 or to k rows from the bottom of the table if k<0.

RELATIVE: Evaluates the host variable or integer constant to an integral value k, and then moves the cursor position to row in the result table 50 k rows after the current row if k>0 or to k rows before the current row if k<0.

The FETCH request may specify where to position the rowset cursor 84 with respect to the current defined rowset as follows:

NEXT ROWSET: Positions the cursor 84 on the next rowset of the result table relative to the current cursor position. The next rowset is obtained by fetching the rows that follow the current rowset, and fetching additional rows until a specified number of rows are fetched, where the number of rows could have been specified in specified in the multiple-row fetch 98 or in a previous fetch or default to one row to fetch if a number of rows is not specified. If a row of the rowset reflects a hole, i.e., the corresponding row in the base table 88 has been deleted, then a warning may be returned. If a row of the rowset would be after the last row of the result table, values are not returned for that row and any subsequent requested rows of the rowset, and a warning is returned.

PRIOR ROWSET: Positions the cursor on the previous rowset of the result table relative to the current position. The prior rowset is obtained by fetching the row that precedes the current rowset, and fetching prior rows until the number of rows specified in the multiple-row fetch 98 (the n in the FOR n ROWS clause) is obtained or the first row of the result table is reached. If a row would be before the first row of the result table then the cursor is positioned on a partial rowset consisting of only those rows that are prior to the current position of the cursor starting with the first row of the result table, and a warning may be returned. Although the rowset is obtained by fetching backwards from before the current rowset, the data may be returned to the application starting with the first row of the rowset, to the end of the rowset. If a row of the rowset reflects a hole, a warning may be returned and data values are not assigned to for that row.

FIRST ROWSET Positions the cursor on the first rowset of the result table, from the first row in the result table. If a row of the rowset reflects a hole, a warning or error may be returned and data values are not assigned for that row.

LAST ROWSET: Positions the cursor on the last rowset of the result table, backwards from the last row in the result table. If a row of the rowset reflects a hole, a warning or error may be returned. If the result table contains fewer rows than the width of the rowset, the last rowset is the same as the first rowset, values are not assigned to host-variable-arrays after the last row of the result table, and a warning is returned. The last rowset is obtained by fetching the last row of the result table and fetching prior rows until the number of rows in the rowset is obtained or the first row of the result table is reached. Although the rowset may be obtained by fetching backwards from the bottom of the result table, the data will be returned to the application starting with the first row of the rowset, to the end of the rowset.

CURRENT ROWSET: If the multiple-row fetch clause 98 specifies a number of rows (the n in the FOR n ROWS clause) that is different from the number of rows specified for a current rowset cursor set by the previous FETCH request, then the cursor is repositioned on the specified number of rows, starting with the first row of the current rowset. Otherwise, the position of the cursor on the current rowset is unchanged. If there are no locks specified for the cursor, such as the case with an uncomitted read (UR) or where a sensitive dynamic scrollable cursor is defined, it is possible that different rows will be returned than the FETCH that established the most recent rowset cursor position. This can occur while refetching the first row of the rowset when it is no longer there. In this case, fetching continues moving forward to get the first row of data for the rowset that satisfies the cursor criteria. This can also occur when changes have been made to other rows in the current rowset such that they no longer exist or have been logically moved within (or out of) the result table 86 of the cursor. If a row of the rowset reflects a hole, a warning or error may be returned.

ROWSET STARTING AT ABSOLUTE or RELATIVE: Positions the cursor on the rowset beginning at the row of the result table that is indicated by the ABSOLUTE or RELATIVE specification. An ABSOLUTE fetch for a specified k fetches from the top or bottom of the table 8, depending on whether k is positive or negative, respectively. The RELATIVE fetch for a specified k fetches relative from the current position. If k=0 and the multiple-row-fetch clause 98 does not specify a number of n rows different from the number of rows most recently specified implicitly or explicitly for this cursor, then the position of the cursor does not change (that is, "RELATIVE ROWSET 0" is the same as "CURRENT ROWSET"). If k=0 and the multiple-row-fetch clause 98 specifies a number (n) different from the number of rows of the current rowset, then the rowset cursor 84 is repositioned on the specified number of rows, starting with the first row of the current rowset. Otherwise, the RELATIVE fetch repositions the cursor so that the first row of the new rowset cursor position is on the row in the result table that is either k rows after the first row of the current rowset cursor position if k>0, or ABS(k) rows before the first row of the current rowset cursor position if k<0. When ROWSET STARTING AT RELATIVE negative n is specified and there are not enough rows between the current position of the cursor and the beginning of the result table to return a complete rowset, a warning may be returned.

Figure 7:
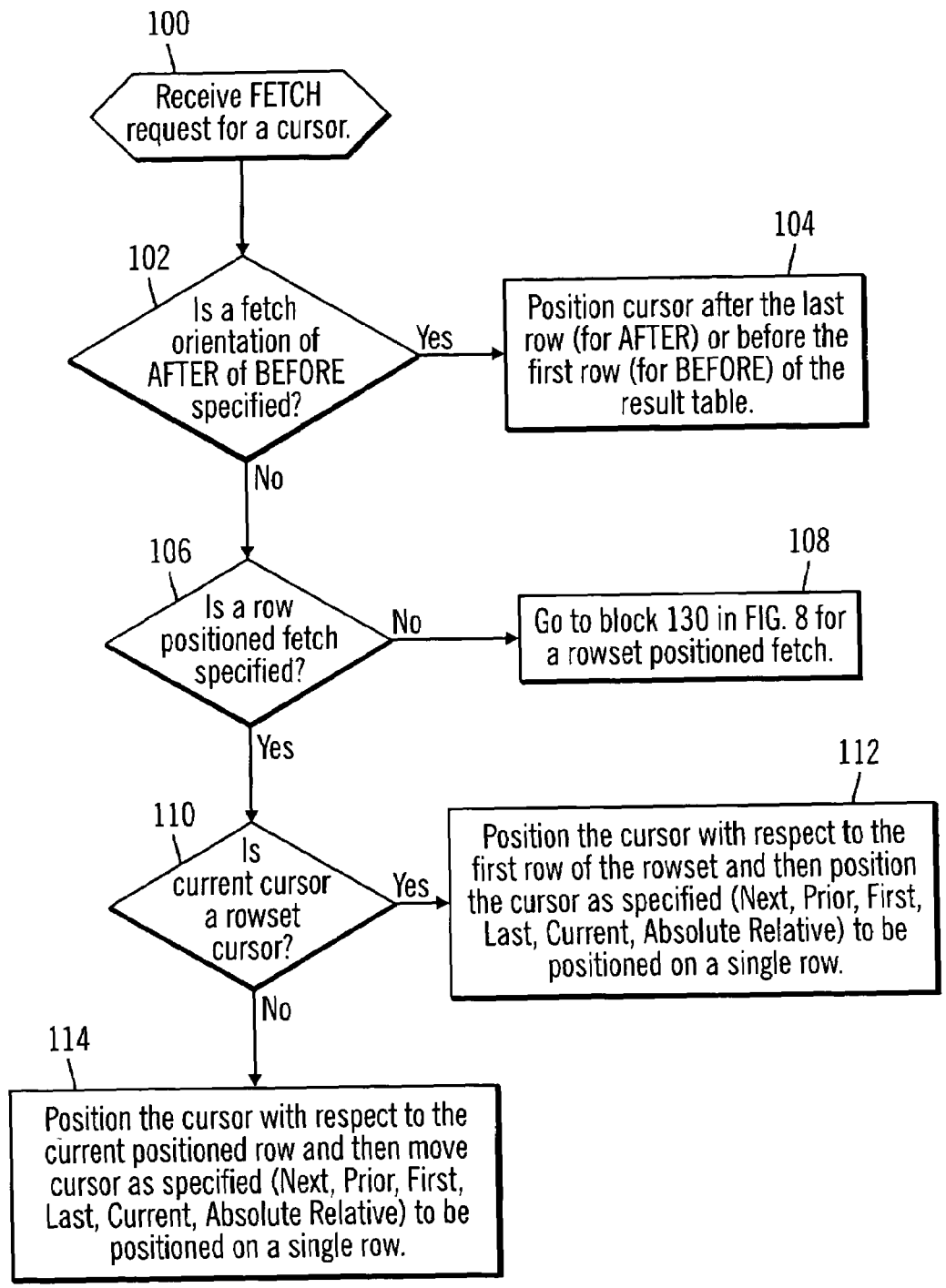
FIGS. 7, 8, and 9 illustrate operations performed to position a cursor with respect to a result table in accordance with preferred embodiments of the present invention.
Figure 8:
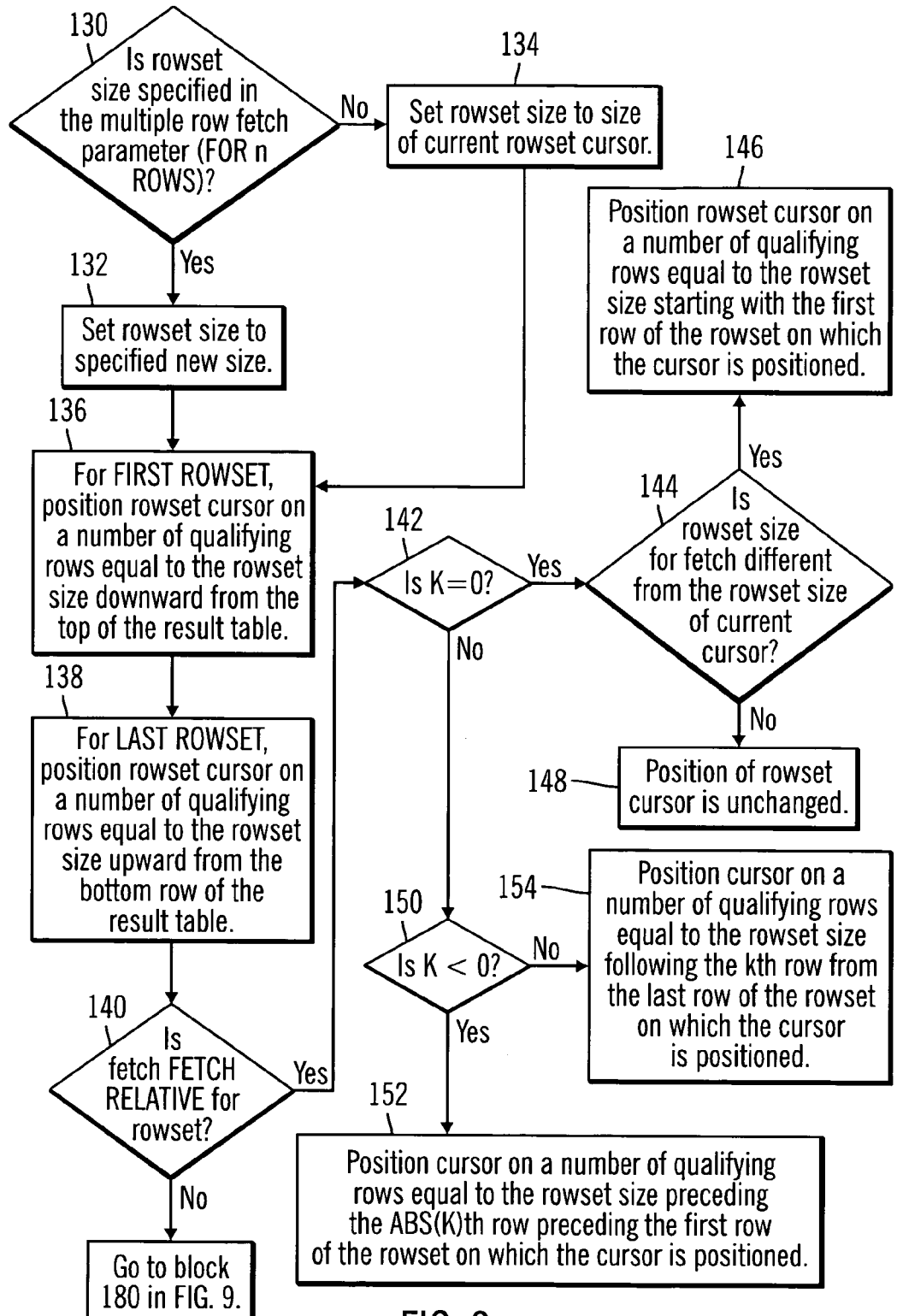
Figure 9:
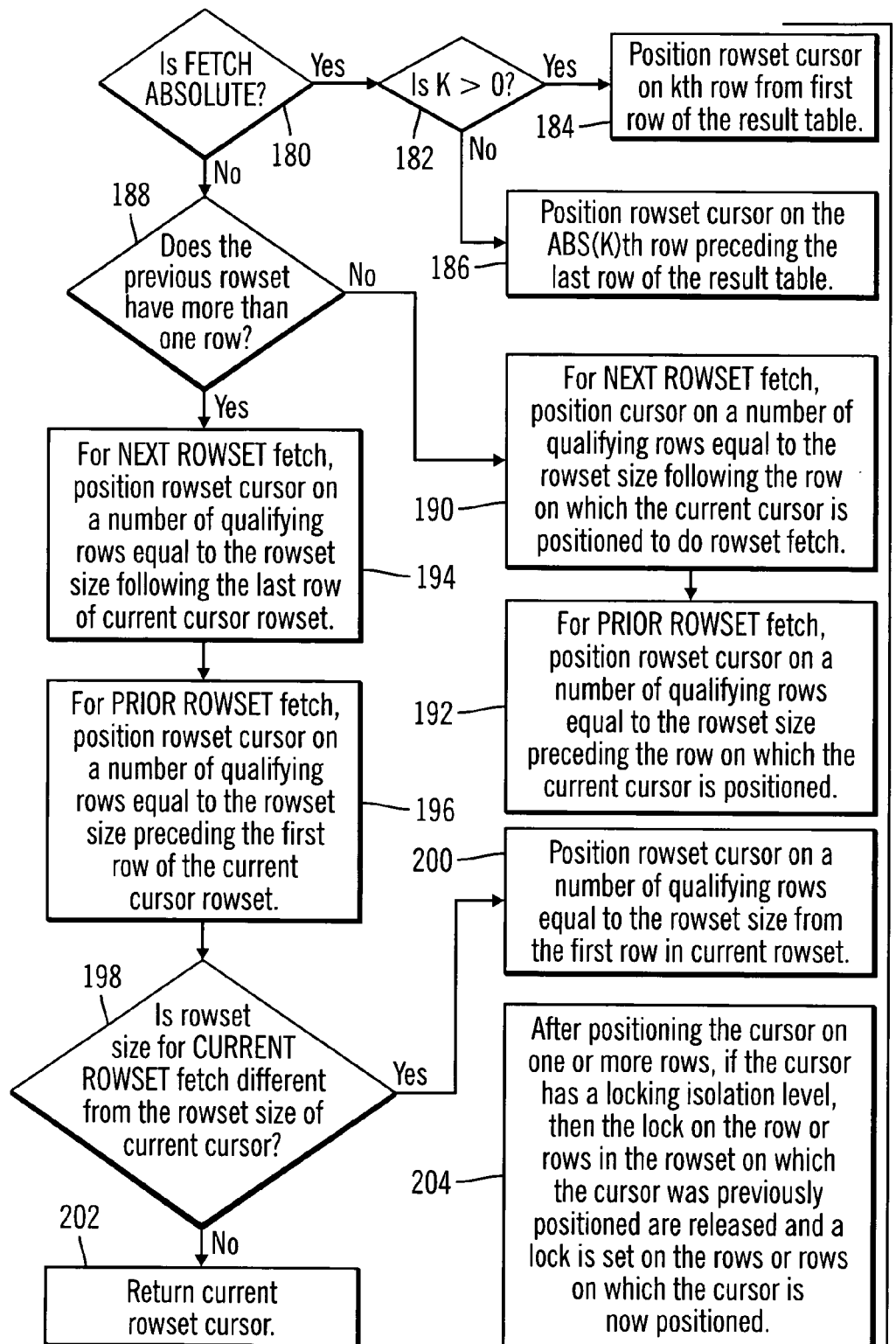

The FETCH may further specify to fetch a single row of data from the result table. A multiple-row-fetch clause 98 retrieves multiple rows for the fetch statement. Both non-scrollable and scrollable cursors may be used to fetch multiple rows. FIGS. 7, 8, and 9 illustrate cursor related operations performed by the database server 4 to reposition the cursor and return fetched data if requested in response to a FETCH statement from a database client 20a, 20b, such as the FETCH statement shown in FIG. 6. Upon receiving (at block 100) the FETCH request, if (at block 102) the fetch orientation 94 indicates BEFORE or AFTER for a row position fetch, then the database server 4 positions (at block 104) the row cursor after the last row (for AFTER) or before the first row (for BEFORE) of the result table (or actual table if the cursor is dynamic). If (at block 106) a rowset positioned 96 fetch is specified, then control proceeds (at block 108) to block 130 in FIG. 8 to handle a rowset fetch. If (at block 106) a rowset positioned fetch 96 is specified and if (at block 110) the current cursor is a rowset cursor, then the database server 4 positions (at block 112) the rowset cursor with respect to the first row of the row set and then positions the cursor as specified in the row positioned clause 96, e.g., NEXT, PRIOR, FIRST, LAST, CURRENT, ABSOLUTE AND RELATIVE, as discussed above, such that the cursor is positioned on a single row. If (at block 110) the current cursor is a row cursor, then the database server 4 positions (at block 114) the cursor with respect to the current positioned single row and then positions the cursor as specified in the row positioned clause 96, e.g., NEXT, PRIOR, FIRST, LAST, CURRENT, ABSOLUTE, OR RELATIVE, to be positioned on a single row.

If (at block 106) the fetch is for a rowset-positioned fetch, then control proceeds to block 130 in FIG. 8. If (at block 130) a rowset size is specified in the multiple-row-fetch field 98 (the n in the FOR n ROWS clause), then the rowset size is set (at block 132) to the specified rowset size (n); otherwise, the rowset size is set (at block 134) to the rowset size of the current rowset cursor. If a rowset size has not been specified, then the rowset size is set to one. From block 132 or 134, if the fetch is a FIRST ROWSET (at block 136), then the rowset cursor 84 is positioned on a number of qualifying rows equal to the rowset size downward from the top of the result table 86. If (at block 138) the fetch is a LAST ROWSET, then the rowset cursor 84 is positioned on a number of qualifying rows equal to the rowset size upward from the bottom row of the result table 86.

If (at block 140) the fetch is a FETCH RELATIVE to position the cursor k rows from the current row and if (at block 142) k equals zero and if (at block 144) the rowset size of the current fetch is different than the rowset size of the current cursor 84, then the rowset cursor 84 is positioned (at block 146) on a number of qualifying rows equal to the rowset size starting with the first row of the rowset on which the cursor 84 is positioned. Otherwise, if (at block 144) the rowset size is the same, then the position of the rowset cursor 84 on the multiple rows remains unchanged (at block 148) for a repeated read isolation level. For other isolation levels the rows returned on the FETCH current may be the same or different depending on database activity. If (at block 150) k is less than zero, i.e., to fetch relative backward, then the rowset cursor 84 is positioned (at block 152) on a number of qualifying rows equal to the rowset size preceding the absolute value of the kth row from the first row of the rowset on which the cursor 84 is currently positioned. Otherwise, if k is greater than zero, i.e., fetch relative forward, then the rowset cursor 84 is positioned (at block 154) on a number of qualifying rows equal to the rowset size following the kth row from the last row of the rowset on which the cursor is positioned.

If the fetch is not FETCH relative, then control proceeds to block 180 in FIG. 9. If (at block 180) the fetch is a FETCH ABSOLUTE and if (at block 182) the number of rows to fetch absolute k is greater than zero, then the rowset cursor 84 is positioned (at block 184) on the kth qualifying row from the first row of the result table 86. If (at block 182) k is less than zero, then the rowset cursor 84 is positioned (at block 186) on the kth qualifying row preceding the last row of the result table 86.

If (at block 180) the fetch is not FETCH ABSOLUTE and if (at block 188) the previous rowset has more than one row, then if (at block 190) the fetch is a NEXT ROWSET fetch, the rowset cursor 84 is positioned on a number of qualifying rows equal to the rowset size following the single row on which the current cursor is positioned. If (at block 192) the fetch is a PRIOR ROWSET fetch, then the rowset cursor 84 is positioned on a number of qualifying rows equal to the rowset size preceding the single row on which the current cursor is positioned. If (at block 188) the current cursor is a rowset cursor and if (at block 194) the fetch is a NEXT ROWSET fetch, then the rowset cursor is positioned on a number of qualifying rows equal to the rowset size following the last row of the current cursor rowset. If (at block 196) the fetch is a PRIOR ROWSET fetch, then the rowset cursor 84 is positioned on a number of qualifying rows equal to the rowset size preceding the first row of the current cursor rowset.

Finally, if the fetch is for a CURRENT ROWSET fetch and if (at block 198) the rowset size for the CURRENT ROWSET fetch is different than the rowset size of the current cursor, then the rowset cursor 84 is positioned (at block 200) on a number of qualifying rows equal to the rowset size from the first row in current rowset. Otherwise, if (at block 198) the rowset sizes are the same, then the current rowset is returned (at block 202). In certain implementations, the current rowset is only returned for the repeated read isolation level. For other isolation levels, FETCH CURRENT ROWSET may return different results.

After positioning the cursor on one or more rows, if (at block 204 in FIG. 9) the cursor has a locking isolation level, then the lock on the row or rows in the rowset on which the cursor was previously positioned are released and a lock is set on the rows or rows on which the cursor is now positioned. For instance for a cursor stability isolation level, if the cursor was previously positioned on one row, then the lock on that one row is released, and a lock is placed on all rows on which the cursor is newly positioned. For a repeated read isolation level, the locks are maintained across multiple fetch operations. For a read stability isolation level, the lock is like a repeated read, but another user can update rows on the page other than the rows on which the cursor is positioned during the current read or previous reads. For an uncommitted read isolation level, no locks are maintained on the rows on which the cursor is positioned.

After positioning the cursor, the database server 4 may return the fetched rows on which the cursor is positioned if the database client 20a, 20b initiating the fetch requested the return of the rows. In further implementations, the fetched rows on which the cursor is newly positioned may be included in a host variable array returned to the database client 20a, 20b initiating the fetch operation.

In further implementations, each row in a rowset or row cursor can be referenced in a subsequent positioned UPDATE or DELETE statement. For a rowset cursor, a subsequent positioned UPDATE or DELETE statement may specify to update or delete a specified row of the rowset or all the rows in the rowset cursor. In certain implementations, to delete or update multiple rows, less than all rows of the rowset cursor, multiple UPDATE or DELETE statements would be used. Any update or delete operation to a row on which a rowset cursor is positioned may cause the corresponding row in the result table to be updated or deleted. The subsequent positioned UPDATE or DELETE may specify a particular row in the rowset cursor to update or delete, e.g., row n, such that the operation is performed with respect to the nth row on which the rowset cursor is positioned.

Additional Implementation Details

The described database management techniques disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the Distributed Relational Database Architecture (DRDA) a client will fetch blocks of data from a server, and the server transmits the blocks of data. The described multiple-row cursor row fetch may be used within the DRDA environment to allow a client to position a rowset cursor on multiple rows and then fetch those multiple rows in the rowset cursor across the network. In this way, if an isolation level including a lock is specified for the rowset cursor, then those rows fetched over the network at the server remain locked for the client that fetched those rows. For the cursor stability isolation levels, the rows would be unlocked at the server when the client initiates a subsequent fetch request.

In described implementations, the result table for updateable and scrollable cursors comprised a standard database table. In alternative embodiments, alternative data and file structures other than a database table may be used to implement the result table.

The result table may comprise a workfile. However, if the cursor is a dynamic cursor, then the result table would comprise rows those rows of the base table that satisfy the cursor search predicates.

The discussion and flowcharts in FIGS. 7–9 describe specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The described implementations implemented the database server in a server accessible to multiple database clients. In alternative implementations, the operations described with respect to the database server may be performed by any database program handling database operations and database tables and indexes, including database programs that execute on computers other than servers.

The described format of the DECLARE and FETCH statements may include information different than that shown herein.

Figure 10:
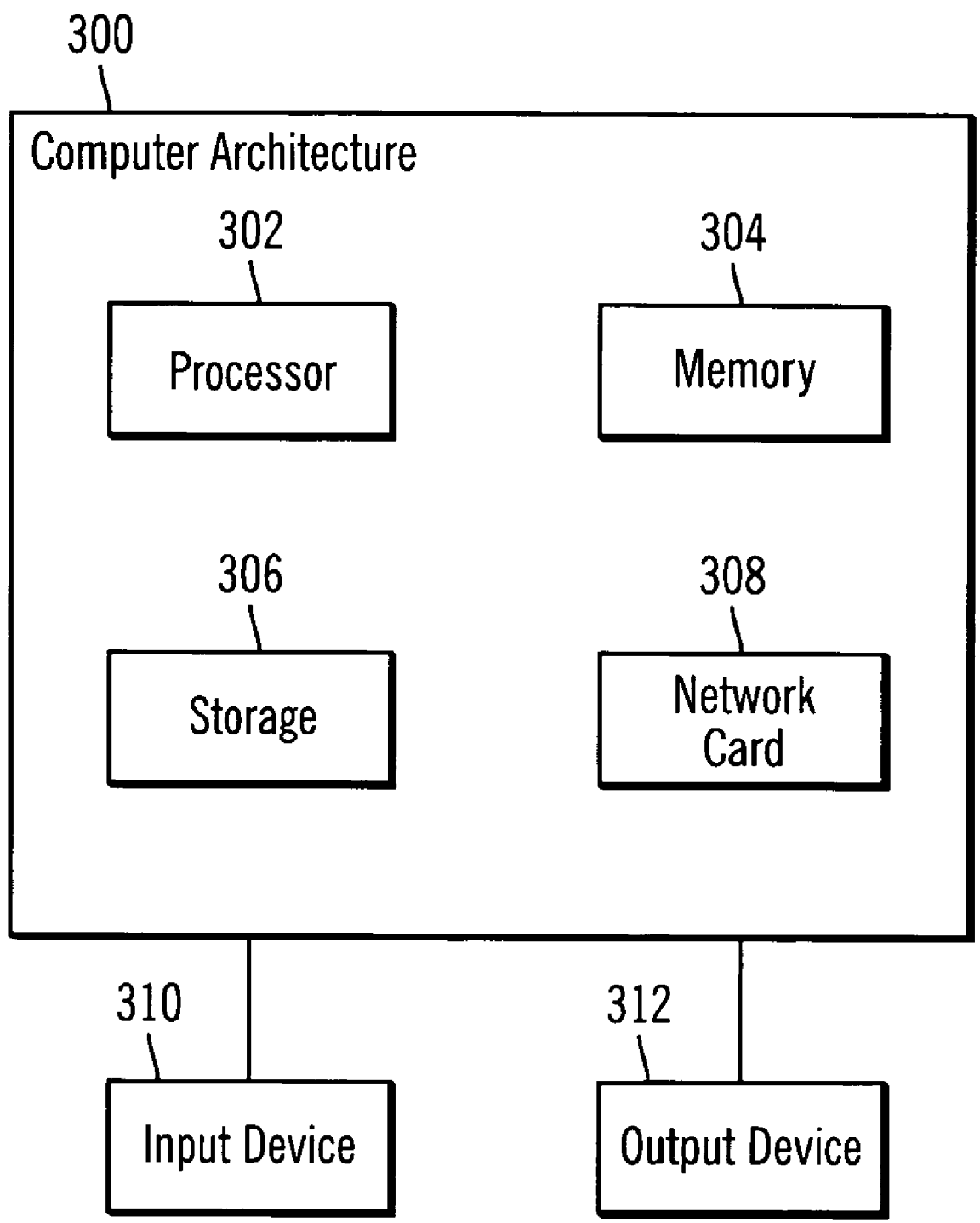
FIG. 10 illustrates a computing architecture that may be used with the described implementations.

FIG. 10 illustrates one implementation of a computer architecture 300 of the computing environment shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for making data available to an application program, comprising:
    generating a cursor positioned with respect to a result table, wherein the cursor specifies a search criteria, wherein the result table includes rows from a base table that satisfy the search criteria, wherein a cursor definition statement defines the cursor to be positioned on a plurality of rows of the result table;
    receiving a fetch request specifying an integer k;
    determining a rowset size from a rowset size definition statement defining the rowset size;
    positioning the cursor on a number of rows comprising the rowset size that satisfy the search criteria and with respect to k rows from a row of the result table; and
    returning the plurality of rows on which the cursor is positioned in response to the fetch request.

2. The method of claim 1, further comprising:
    placing a lock on the plurality of rows of the result table on which the cursor is positioned.

3. The method of claim 2, wherein the fetch request is received from a client at a server, wherein returning the plurality of rows further comprises:
    returning, by the server, the plurality of rows at the server on which the cursor is positioned to the client that sent the fetch request, wherein the lock is placed on the plurality of rows at the server to block the plurality of rows on which the cursor is positioned.

4. The method of claim 2, further comprising:
    receiving a subsequent fetch request to reposition the cursor on at least one row of the result table; and
    releasing the lock on the plurality of rows of the result table on which the cursor is currently positioned before being repositioned.

5. The method of claim 1, wherein the statement defines the cursor to be positioned on the plurality of rows of the result table before receiving the fetch request.

6. The method of claim 5, wherein positioning the cursor with respect to k rows from one row of the result table comprises one of:
    positioning the cursor at k rows preceding a first row of the current plurality of rows that satisfy the search criteria;
    positioning the cursor at k rows from a first row of the result table that satisfy the search criteria; and
    positioning the cursor at k rows preceding an end of the result table that satisfy the search criteria.

7. The method of claim 1, wherein positioning the cursor on the number of rows that satisfy the search criteria and is positioned with respect to k rows from the row of the result table comprises one of:
    positioning the cursor on the number of rows that satisfy the search criteria and precede k rows preceding a first row of the current plurality of rows that satisfy the search criteria;

positioning the cursor on the number of rows that satisfy the search criteria and follow a number of rows equal to the rowset size from a kth row from a first row of the result table;
positioning the cursor on the number of rows that satisfy the search criteria and precedes k rows that satisfy the search criteria preceding a last row of the result table.

8. The method of claim 1, further comprising:
receiving a request to modify at least one row in the rows on which the cursor is positioned; and
modifying the at least one row on which the cursor is positioned as indicated in the request.

9. The method of claim 8, wherein the modification comprises updating or deleting the at least one row on which the cursor is positioned as indicated in the request.

10. The method of claim 1, wherein the cursor comprises one of a static cursor or dynamic cursor, wherein if the cursor is static, then the cursor is either sensitive or insensitive to changes in the base table from which the result table is generated.

11. The method of claim 1, wherein the statement defines the cursor to be positioned on the plurality of rows of the result table before receiving the fetch request, and wherein the current plurality of rows is a different number than a number of the rows on which the cursor is positioned in response to the fetch request.

12. A system for making data available to an application program, comprising:
a memory;
a base table;
a result table, wherein the result table includes rows from a base table that satisfy a search criteria, wherein a cursor definition statement defines the cursor to be positioned on a plurality of rows of the result table;
means for generating a cursor positioned with respect to a result table;
means for receiving a fetch request specifying an integer k;
means for determining a rowset size from a rowset size definition statement defining the rowset size;
means for positioning the cursor on a number of rows comprising the rowset size that satisfy the search criteria and with respect to k rows from a row of the result table; and
means for returning the plurality of rows on which the cursor is positioned in response to the fetch request.

13. The system of claim 12, further comprising:
means for placing a lock on the plurality of rows of the result table on which the cursor is positioned.

14. The system of claim 13, wherein the fetch request is received from a client at a server, wherein returning the plurality of rows further comprises:
means, performed by the server, for returning the plurality of rows at the server on which the cursor is positioned to the client that sent the fetch request, wherein the lock is placed on the plurality of rows at the server to block the plurality of rows on which the cursor is positioned.

15. The system of claim 13, further comprising:
means for receiving a subsequent fetch request to reposition the cursor on at least one row of the result table; and
means for releasing the lock on the plurality of rows of the result table on which the cursor is currently positioned before being repositioned.

16. The system of claim 12, wherein the statement defines the cursor to be positioned on the plurality of rows of the result table before receiving the fetch request.

17. The system of claim 16, wherein the means for positioning the cursor with respect to k rows from one row of the result table performs one of:
positioning the cursor at k rows preceding a first row of the current plurality of rows that satisfy the search criteria;
positioning the cursor at k rows from a first row of the result table that satisfy the search criteria; and
positioning the cursor at k rows preceding an end of the result table that satisfy the search criteria.

18. The system of claim 12, wherein the means for positioning the cursor on the number of rows that satisfy the search criteria and is positioned with respect to k rows from the row of the result table comprises one of:
positioning the cursor on the number of rows that satisfy the search criteria and precede k rows preceding a first row of the current plurality of rows that satisfy the search criteria;
positioning the cursor on the number of rows that satisfy the search criteria and follow a number of rows equal to the rowset size from a kth row from a first row of the result table;
positioning the cursor on the number of rows that satisfy the search criteria and precedes k rows that satisfy the search criteria preceding a last row of the result table.

19. The system of claim 12, further comprising:
means for receiving a request to modify at least one row in the rows on which the cursor is positioned; and
means for modifying the at least one row on which the cursor is positioned as indicated in the request.

20. The system of claim 12, wherein the cursor comprises one of a static cursor or dynamic cursor, wherein if the cursor is static, then the cursor is either sensitive or insensitive to changes in the base table from which the result table is generated.

21. An article of manufacture embodied in a computer readable storage medium including code executed for making data available to an application program, wherein the article of manufacture causes operations to be performed, the operations comprising:
generating a cursor positioned with respect to a result table, wherein the cursor specifies a search criteria, wherein the result table includes rows from a base table that satisfy the search criteria, wherein a cursor definition statement defines the cursor to be positioned on a plurality of rows of the result table;
receiving a fetch request specifying an integer k;
determining a rowset size from a rowset size definition statement defining the rowset size;
positioning the cursor on a number of rows comprising the rowset size that satisfy the search criteria and with respect to k rows from a row of the result table having rows that satisfy the search criteria; and
returning the plurality of rows on which the cursor is positioned in response to the fetch request.

22. The article of manufacture of claim 21, wherein the operations further comprise:
placing a lock on the plurality of rows of the result table on which the cursor is positioned.

23. The article of manufacture of claim 22, wherein the fetch request is received from a client at a server, and wherein returning the plurality of rows further comprises:
returning, by the server; the plurality of rows at the server on which the cursor is positioned to the client that sent the fetch request, wherein the lock is placed on the plurality of rows at the server to block the plurality of rows on which the cursor is positioned.

24. The article of manufacture of claim 22, wherein the operations further comprise:
    receiving a subsequent fetch request to reposition the cursor on at least one row of the result table; and
    releasing the lock on the plurality of rows of the result table on which the cursor is currently positioned before being repositioned.

25. The article of manufacture of claim 21, wherein the statement defines the cursor to be positioned on the plurality of rows of the result table before receiving the fetch request.

26. The article of manufacture of claim 25, wherein positioning the cursor with respect to k rows from one row of the result table comprises one of:
    positioning the cursor at k rows preceding a first row of the current plurality of rows that satisfy the search criteria;
    positioning the cursor at k rows from a first row of the result table that satisfy the search criteria; and
    positioning the cursor at k rows preceding an end of the result table that satisfy the search criteria.

27. The article of manufacture of claim 21, wherein positioning the cursor on the number of rows that satisfy the search criteria and is positioned with respect to k rows from the row of the result table comprises one of:
    positioning the cursor on the number of rows that satisfy the search criteria and precede k rows preceding a first row of the current plurality of rows that satisfy the search criteria; positioning the cursor on the number of rows that satisfy the search criteria and follow a number of rows equal to the rowset size from a kth row from a first row of the result table;
    positioning the cursor on the number of rows that satisfy the search criteria and precedes k rows that satisfy the search criteria preceding a last row of the result table.

28. The article of manufacture of claim 21, wherein the operations further comprise:
    receiving a request to modify at least one row in the rows on which the cursor is positioned; and
    modifying the at least one row on which the cursor is positioned as indicated in the request.

29. The article of manufacture of claim 28, wherein the modification comprises updating or deleting the at least one row on which the cursor is positioned as indicated in the request.

30. The article of manufacture of claim 21, wherein the cursor comprises one of a static cursor or dynamic cursor, wherein if the cursor is static, then the cursor is either sensitive or insensitive to changes in the base table from which the result table is generated.

31. The article of manufacture of claim 21, wherein the statement defines the cursor to be positioned on the plurality of rows of the result table before receiving the fetch request, and wherein the current plurality of rows is a different number than a number of the rows on which the cursor is positioned in response to the fetch request.

* * * * *